US 8,240,558 B2

(12) United States Patent  (10) Patent No.: US 8,240,558 B2
O'Donnell  (45) Date of Patent: Aug. 14, 2012

(54) METHOD OF PROCESSING A USER DATA CARD, AN INTERFACE MODULE AND A GAMING SYSTEM (75) Inventor: Peter William O'Donnell, Carringbah (AU)

(73) Assignee: Aristocrat Technologies Australia Pty Limited (AU)

( * ) Notice: Subject to any disclaimer, the term of this patent is extended or adjusted under 35 U.S.C. 154(b) by 663 days.

(21) Appl. No.: 12/354,499

(22) Filed: Jan. 15, 2009

(65) Prior Publication Data

US 2009/0230186 A1 Sep. 17, 2009

(30) Foreign Application Priority Data

Jan. 15, 2008 (AU) .................................. 2008900181

(51) Int. Cl.
*G06K 5/00* (2006.01)
(52) U.S. Cl. ........................................................ 235/380
(58) Field of Classification Search .................. 235/380, 235/492, 493
See application file for complete search history.

(56) References Cited

U.S. PATENT DOCUMENTS

| 5,434,398 | A | 7/1995 | Goldberg |  |
|---|---|---|---|---|
| 7,874,911 | B2* | 1/2011 | Walker et al. ................. | 463/20 |
| 2001/0037312 | A1 | 11/2001 | Gray et al. |  |
| 2002/0145051 | A1 | 10/2002 | Charrin |  |
| 2003/0024993 | A1 | 2/2003 | Gould et al. |  |
| 2004/0035942 | A1 | 2/2004 | Silverman |  |
| 2004/0236680 | A1 | 11/2004 | Luoffo et al. |  |
| 2004/0262379 | A1* | 12/2004 | Gomes ......................... | 235/379 |
| 2005/0127188 | A1 | 6/2005 | Mahalal |  |
| 2005/0139652 | A1 | 6/2005 | Iwamura |  |
| 2005/0177658 | A1 | 8/2005 | Perrinot |  |
| 2005/0188194 | A1 | 8/2005 | Fascenda |  |
| 2005/0236480 | A1 | 10/2005 | Vrotsos et al. |  |
| 2005/0264398 | A1 | 12/2005 | Siegel et al. |  |
| 2006/0039564 | A1 | 2/2006 | Rao |  |
| 2006/0142058 | A1 | 6/2006 | Elias et al. |  |
| 2006/0181478 | A1 | 8/2006 | Benato |  |
| 2006/0226217 | A1 | 10/2006 | Narendra et al. |  |
| 2007/0023498 | A1 | 2/2007 | Spaeth et al. |  |
| 2007/0131759 | A1 | 6/2007 | Cox et al. |  |
| 2009/0011821 | A1* | 1/2009 | Griswold et al. ............... | 463/25 |
| 2009/0083188 | A1* | 3/2009 | Saltiel ............................ | 705/64 |

FOREIGN PATENT DOCUMENTS

| CA | 2529176 | 12/2004 |
|---|---|---|
| EP | 0712087 A2 | 5/1996 |
| EP | 1050993 | 11/2000 |
| EP | 1244078 | 9/2002 |
| EP | 1262860 | 12/2002 |
| EP | 1679640 A1 | 7/2006 |
| GB | 2419787 | 5/2006 |
| GB | 2434661 | 8/2007 |
| GB | 2434950 | 8/2007 |
| KR | 20020008918 | 2/2002 |

(Continued)

*Primary Examiner* — Seung Lee
(74) *Attorney, Agent, or Firm* — McAndrews, Held & Malloy, Ltd.

(57) ABSTRACT

A method of processing a user data card comprising: determining that a user data card comprising a non-compatible smart card has been entered into a card reader; obtaining a user identifier from a magnetic stripe of the user data card; and processing the user identifier to obtain data from a user record to enable further processing in respect of the user data card.

19 Claims, 5 Drawing Sheets

FOREIGN PATENT DOCUMENTS

| | | |
|---|---|---|
| MX | PA04005607 | 4/2005 |
| MX | PA05001753 | 4/2005 |
| NZ | 533945 | 9/2006 |
| SE | 512470 | 3/2000 |
| TW | 522350 B | 3/2003 |
| WO | WO0150429 | 7/2001 |
| WO | WO0159730 | 8/2001 |
| WO | WO0247019 | 6/2002 |
| WO | 2004095352 A1 | 11/2004 |
| WO | WO2005002130 | 1/2005 |
| WO | WO2005057341 | 6/2005 |
| WO | 2005124704 A1 | 12/2005 |
| WO | WO2006091709 | 8/2006 |

* cited by examiner

METHOD OF PROCESSING A USER DATA CARD, AN INTERFACE MODULE AND A GAMING SYSTEM

RELATED APPLICATIONS

This application claims priority to Australian Provisional Patent Application No. 2008900181, having a filing date of Jan. 15, 2008, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The invention relates to a method of processing a user data card, an interface module and a gaming system.

BACKGROUND OF THE INVENTION

Player loyalty cards are a way for gaming venues to keep track of players playing within the venue and to provide them with loyalty rewards. Such cards are typically inserted into player tracking modules mounted to a gaming machine and connected between the gaming machine and a loyalty system. The servers that provide the loyalty system can also provide other functions. When a decision is made to replace a system, logistical problems arise because of the difficulty of replacing loyalty cards. Such problems can lead to delays in deployment of a new system.

BRIEF SUMMARY OF THE INVENTION

In a first aspect, the invention provides a method of processing a user data card comprising:
  determining that a user data card comprising a non-compatible smart card has been entered into a card reader;
  obtaining a user identifier from a magnetic stripe of the user data card; and
  processing the user identifier to obtain data from a user record to enable further processing in respect of the user data card.

In an embodiment, the further processing includes transferring credit from the user record to a gaming machine.

In an embodiment, the method further comprises transferring credit to the user record from a gaming machine.

In an embodiment, the method comprises issuing an error message if the user data card does not have a magnetic stripe or the magnetic stripe does not have a user identifier.

In a second aspect, the invention provides an interface module for a gaming system, the interface module arranged to be placed in data communication with a card reader and a user database storing user records, the interface module arranged to:
  determine that a user data card comprising a non-compatible smart card has been entered into a card reader;
  obtain a user identifier from a magnetic stripe of the user data card; and
  process the user identifier to obtain data from a user record associated with the identifier to enable further processing in respect of the user data card.

In an embodiment, the interface module is arranged to process the user identifier to send a request to a user server storing said user record.

In an embodiment, the further processing includes participating in the transfer of credit from the user record to a gaming machine.

In an embodiment, the further processing includes participating in the transfer of credit to the user record from a gaming machine.

In an embodiment, the interface module is arranged to issue an error message if the user data card does not have a magnetic stripe or the magnetic stripe does not have a user identifier.

In a third aspect, the invention provides a gaming system comprising:
  a card reader;
  a user database storing user records; and
  an interface module arranged to:
    determine that a user data card comprising a non-compatible smart card has been entered into a card reader;
    obtain a user identifier from a magnetic stripe of the user data card; and
    process the user identifier to obtain data from a user record associated with the user identifier to enable further processing in respect of the user data card.

In an embodiment, the gaming system further comprises a gaming machine, and wherein the further processing comprises transferring credit from the user record to a gaming machine.

In an embodiment, the gaming system further comprises a gaming machine, and wherein the further processing comprises transferring credit to the user record to a gaming machine.

In an embodiment, the gaming system comprises a player marketing module in data communication with the gaming machine, the card reader and the interface module provided by the player marketing module.

In an embodiment, the gaming system comprises a user server hosting said user database.

In an embodiment, the interface module is arranged to issue an error message if the user data card does not have a magnetic stripe or the magnetic stripe does not have a user identifier.

In a fourth aspect, the invention provides a method of processing user transactions comprising:
  conducting transactions for a user by retrieving data from a user record using a user identifier obtained from a magnetic stripe of a hybrid data card while the user has a hybrid data card comprising a non-compatible smart card; and
  switching to processing from a compatible smart card once it is detected that a user has a user data card comprising a valid smart card.

In an embodiment, the method comprises writing data to the valid smart card in response to determining that the user has a new user data card comprising a valid smart card.

In a fifth aspect, the invention provides an interface module for a gaming system, the interface module arranged to:
  conduct transactions for a user by retrieving data from a user record using a user identifier obtained from a magnetic stripe of a hybrid data card while the user has a hybrid data card comprising a non-compatible smart card; and
  switch to processing from a compatible smart card once it is detected that a user has a user data card comprising a valid smart card.

In an embodiment, the interface module is arranged to write data to the valid smart card in response to determining that the user has a new user data card comprising a valid smart card.

In a sixth aspect, the invention provides a gaming system comprising:

a card reader;

a user database storing user records; and an interface module arranged to:

conduct transactions for a user by retrieving data from a user record using a user identifier obtained from a magnetic stripe of a hybrid data card while the user has a hybrid data card comprising a non-compatible smart card; and switch to processing from a compatible smart card once it is detected that a user has a user data card comprising a valid smart card.

In an embodiment, the interface module is arranged to write data to the valid smart card in response to determining that the user has a new user data card comprising a valid smart card.

In an embodiment, the gaming system comprises a gaming machine and a player marketing module in data communication with the gaming machine, the card reader and the interface module provided by the player marketing module.

In an embodiment, the gaming system comprises a user server hosting said user database.

BRIEF DESCRIPTION OF SEVERAL VIEWS OF THE DRAWINGS

An embodiment of the invention will now be described in relation to the following drawings in which.

DETAILED DESCRIPTION OF THE INVENTION

The embodiment provides a gaming system having an interface module adapted to handle the migration from one form of smart card to another. In particular, to process transactions in respect of non-valid smart cards by employing a user identifier stored on a magnetic stripe of a hybrid card.

Figure 1:
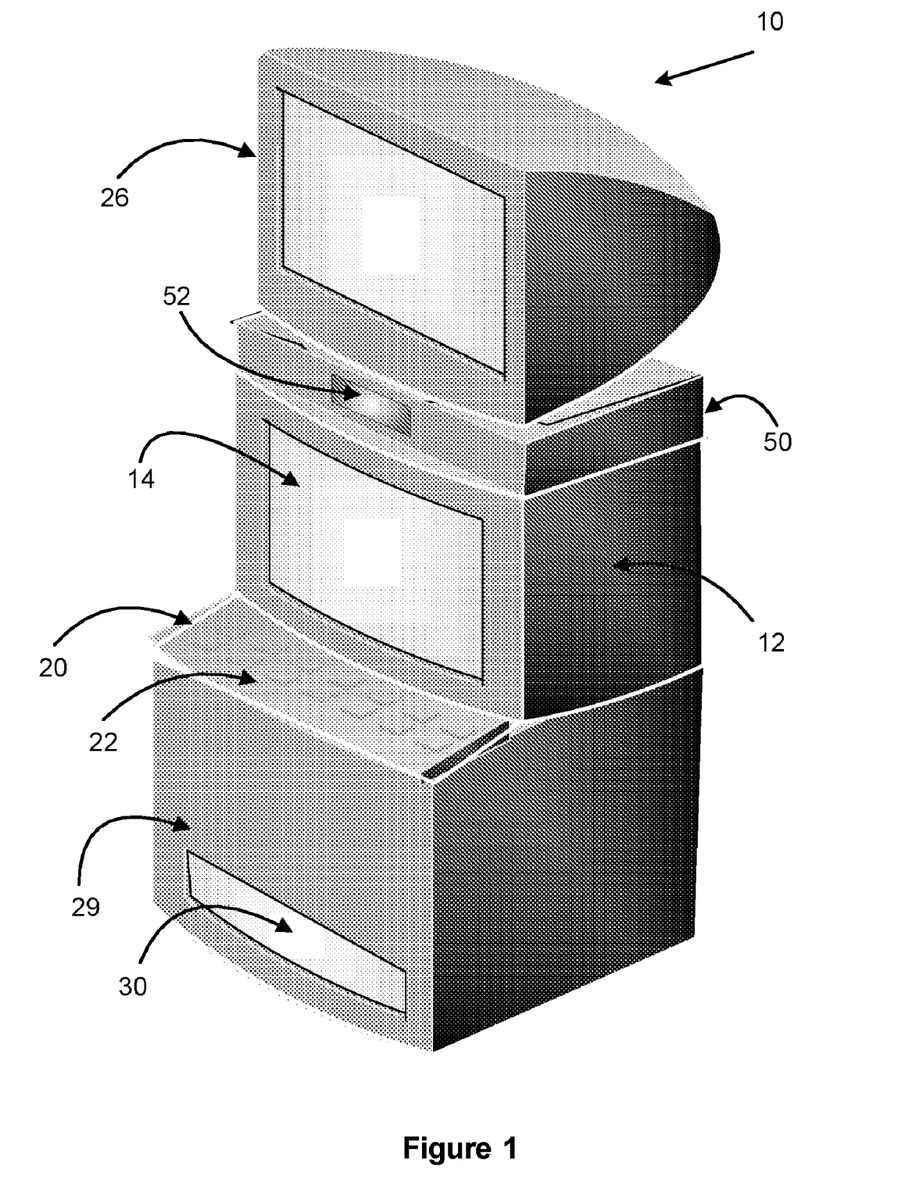
FIG. 1 is a perspective view of a gaming machine.

A gaming machine 10 is illustrated in FIG. 1. The gaming machine 10 includes a cabinet 12 having a display 14 on which is displayed representations of a game that can be played by a player. A mid-trim 20 of the gaming machine 10 houses a bank of buttons 22 for enabling a player to interact with the gaming machine, in particular during game play and providing a player instruction input mechanism. The mid-trim 20 also houses a credit input mechanism for example a coin input chute and/or a bill collector 24B. Other credit input mechanisms may also be employed, for example, a card reader for reading a smart card, debit card or credit card.

Artwork and/or information, for example pay tables and details of bonus awards and other information or images relating to the game may be provided on a front panel 29 of the console 12. A coin tray 30 is mounted beneath the front panel 29 for dispensing cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. The top box 26 also includes a display which may be of the same type as the display 14, or of a different type. The display(s) 14, 26 and the buttons 22 collectively provide a player interface.

A player marketing module (PMM) 50 having a display 52 is mounted to the cabinet 12 and connected to the gaming machine 10 via a serial port of the main board of the gaming machine. The main purpose of the PMM 50 is to allow the player to interact with a player loyalty system. The PMM has a card reader for the purpose of reading a user data card, sometimes known as a player tracking device. PMMs are also known as player tracking modules (PTMs).

Figure 2:
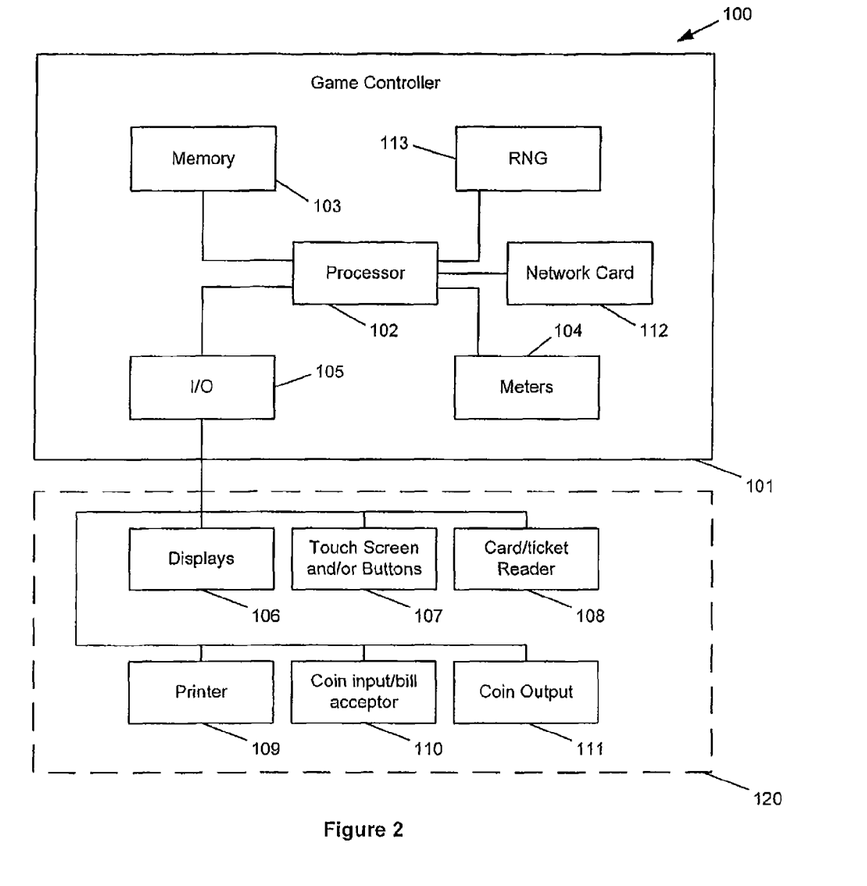
FIG. 2 is a block diagram of the operative components of an exemplary gaming machine.

FIG. 2 shows a block diagram of operative components of the gaming machine 10 which includes a game controller 101 having a processor 102. Instructions and data to control operation of the processor 102 are stored in a memory 103, which is in data communication with the processor 102. Herein the term "processor" is used to refer generically to any device that can process game play instructions in accordance with game play rules and may include: a microprocessor, microcontroller, programmable logic device or other computational device, a general purpose computer (e.g. a PC) or a server.

Typically, the gaming machine 10 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 10. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 2, a player interface 120 includes peripheral devices that communicate with the game controller 101 including one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 10, or hardware may be omitted as required for the specific implementation.

In addition, the gaming machine 10 may include a communications interface 112, which may include a number of components, for example a network card and a serial port. The communication interface may, for example, send status information, accounting information or other information to a central controller, server or database and receive data or commands from the central controller, server or database. In the embodiment, all communications with any central devices are via the PMM and, more specifically via the serial port.

Figure 3:
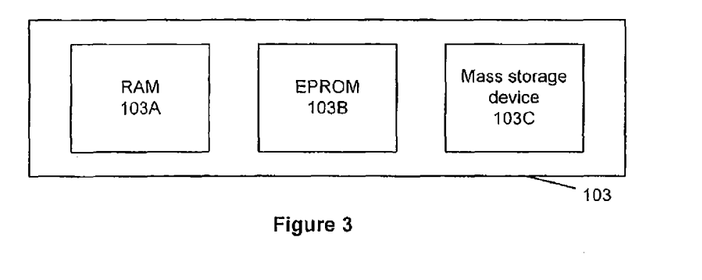
FIG. 3 is a block diagram of an exemplary memory of a gaming machine.

FIG. 3 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

Figure 4:
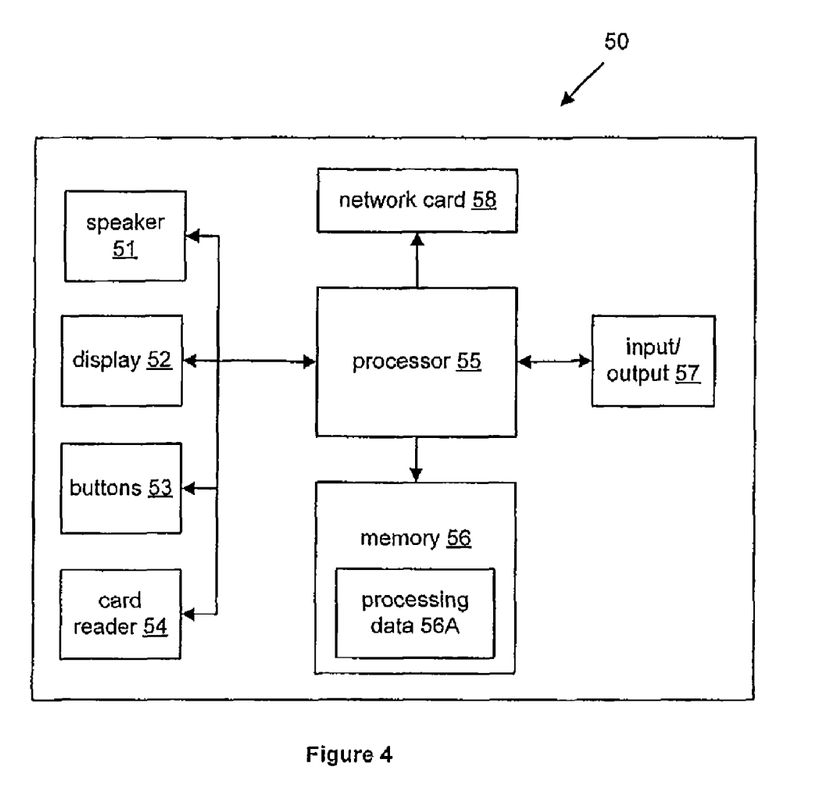
FIG. 4 is a block diagram of an exemplary player marketing module.

FIG. 4 is a block diagram of a player marketing module 50. The player marketing module 50 is connected via input/output port 57 to a serial input output port of the input/output section 105 of the electronic gaming machine. The player marketing module has a card reader 54 and a display 52 which may be a touch screen display. The PMM 50 may also have buttons 53 for receiving a player input (at least in embodiments where there is no touch screen display) and a speaker 51. Input received from the card reader 54 is processed by processor 55 based on the data stored in memory 56. The PMM 50 is connected to the other components of the gaming system via a network card 58.

Processor 55 is also arranged to communicate with a gaming machine 10 via input/output port 57 to cause locking of the gaming machine. The PMM 50 is linked to the EGM via the serial port of the EGM and the EGM is arranged to require a response to a polling signal from the PMM 50 on the serial port before it can accept further playing instructions. The PMM 50 can exploit this requirement to lock the EGM by failing to respond to the polling signal.

In the embodiment, the card reader 54 is adapted to read user data cards that have either or both of a smart card or a magnetic stripe. The memory 56 stores card processing data 56A which is executed by the processor 55 to enable the PMM 50 to provide an interface module. The function of the interface module is to handle the insertion of non-valid smart cards into the card reader and, in particular, non-valid smart cards of hybrid data cards which also have a magnetic stripe. This allows for the migration from user data cards having a first, unsupported, form of smart card to user data cards having a second form of supported smart card without having to build in legacy support for the first smart card—i.e. the PMM need not be compatible with the first smart card. Indeed, it also allows for some delay before deployment of the supported smart card. Thus, allowing other system components that require the user data card to be deployed into a gaming system.

Figure 6:
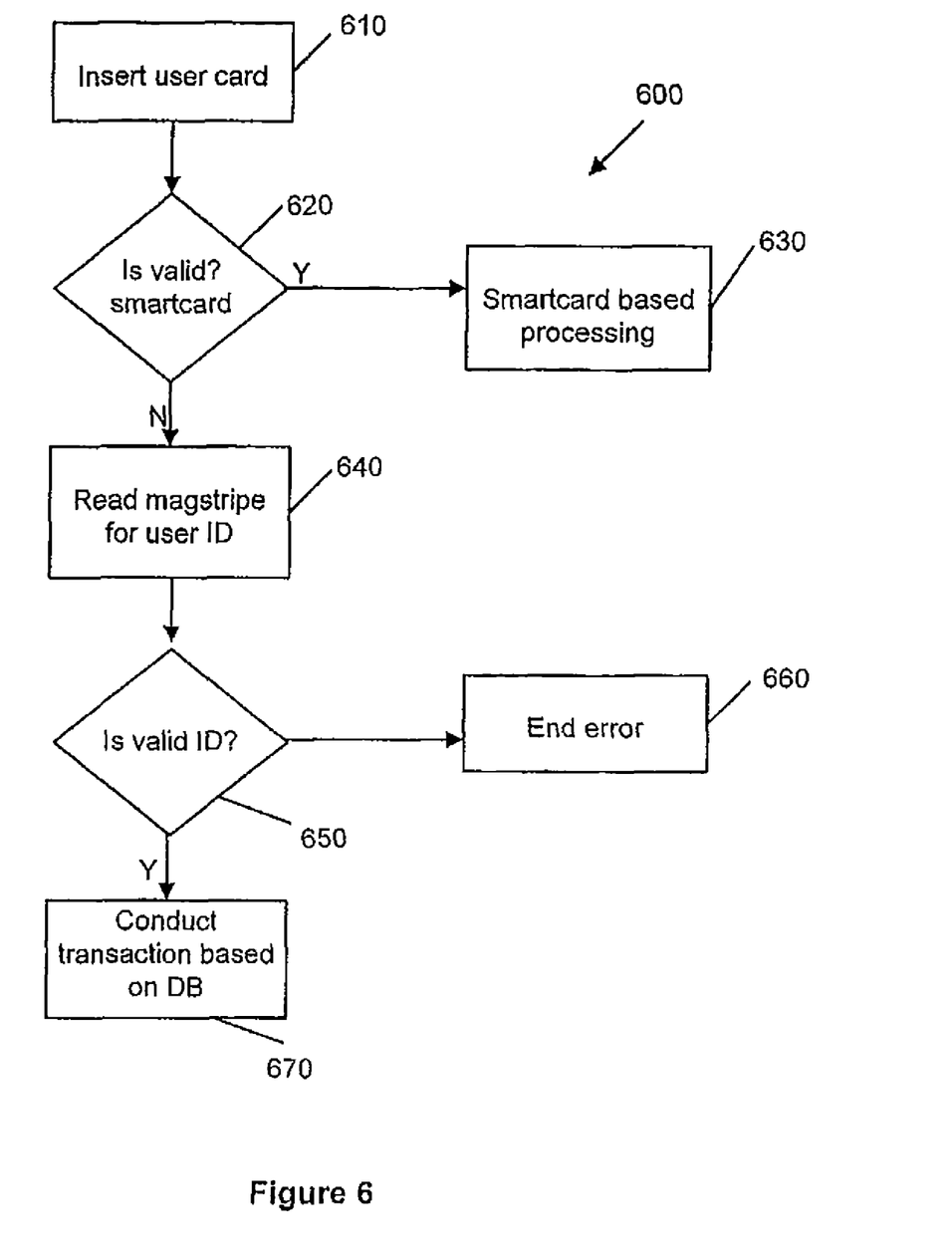
FIG. 6 is a flow chart of an embodiment.

The process 600 is summarised in FIG. 6 which shows that after a user data card is inserted 610, the interface module determines based on data received from the card reader whether the smart card is valid. If it is valid, the process proceeds to smart card processing 630.

If it is invalid, the process proceeds to reading 640 the magnetic stripe to obtain a user identifier. It will be appreciated that early in a deployment, all smart cards may be invalid. If the magnetic stripe does not contain a user identifier or the card doesn't have a magnetic stripe, an error message is displayed to the user. For example, to instruct the player to seek assistance from service personnel.

Once a valid user ID read has occurred the method proceeds to conducting a transaction 670 in respect of the user data card by accessing a user record corresponding to the user identifier from a user database connected via network card 58 to PMM 50. For example, to transfer an amount of credit from the user record to the gaming machine 10 to which the PMM 50 is connected. Similarly, when a card remove instruction is entered into the PMM, the credit balance on the gaming machine is transferred to the user record.

Figure 5:
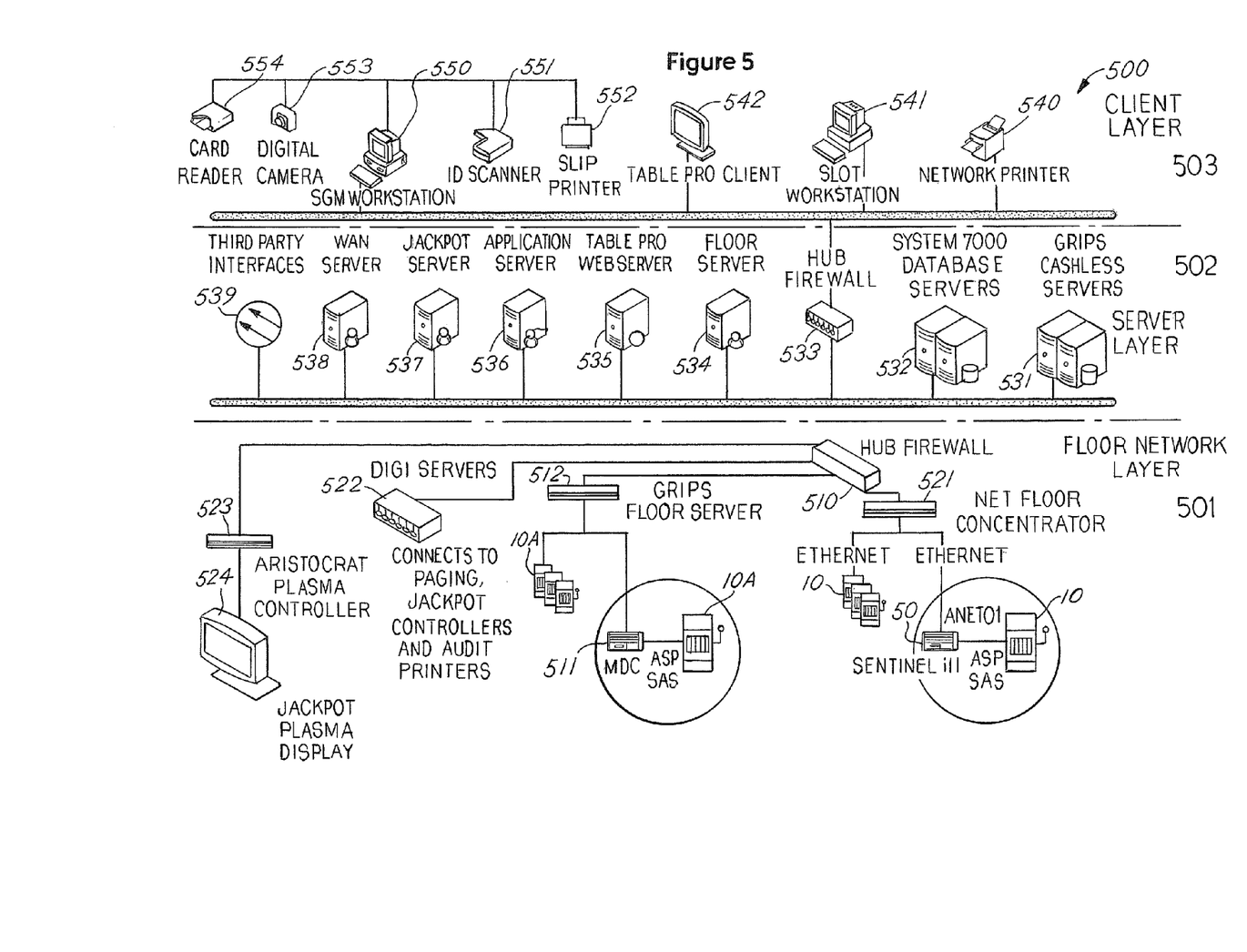
FIG. 5 shows an exemplary gaming system.

FIG. 5 shows an exemplary gaming system 500 to which such interface modules can be deployed. The gaming system 500 5 is shown during a time that when there are two types of player marketing modules 50, 511 deployed to the gaming floor within one gaming venue, namely a player marketing module 511 of an old system which is no longer to be supported subsequent to deployment of the new system. It will be appreciated until such time that all the superseded PMMs 511 have been removed from the gaming floor, support needs to be provided for them as well as requiring the new PMMs 550 to be able to support transactions with user data cards which operate with old PMMS 511.

FIG. 5 shows the gaming system broken down into several layers including the floor network layer 501, a server layer 502 and a client layer 503. All floor network layer 501 components are connected to the server layer via a hub firewall 510. A plurality of gaming machines 10A are connected via old PMMs 511 and floor server 512 to the server layer 502. A plurality of new EGMs 10 are connected via new PMMs 50 and a floor concentrator 521 via hub firewall 510 to the server layer 502. Other components maybe present in the floor network layer 503 including a digi server 522 which connects to paging, jackpot controllers and audit printers and a jackpot plasma display 524 connected via a plasma controller 523 to the server layer 502.

The server layer 502 contains a number of components including a server 532 which holds a transactions made in relation to the old PMMs 511, a system 7000 system 532 provided by Aristocrat Technologies Australia Pty Ltd which is arranged to process transactions made in relation to the new PMMs 50 as well as to carry out numerous other functions, hub fire wall 533, floor server 534, a table pro web server 535 an application server 536 a jackpot server 537 and a WAN server 538 as well as capacity for third party interfaces 539.

The client layer 503 contains a network printer 540 a slot workstation 541, a table pro client 542 and a SGM workstation 550 connected to a card reader 554 a digital camera 553, an ID scanner 551 and a slip printer 552.

In operation of this system, the intention is for the system 7000 server 532 to take over user transactions and accordingly it has a user database which stores user records. Accordingly, when a card for the old PMMs 511, in this example a hybrid card having both a smartcard and a magnetic strip inserted into the new PMM 50 it is necessary for the new PMM 50 to be able carry out transactions and load credit that stored on that card to the gaming machine 10. Accordingly, the PMM 50 contains the interface module described above such that it can access the user data record based on a user identifier associated with the record and stored on the magnetic stripe. The user database contains a back up of the data on the smart card which is use rather than accessing the balance stored on the smart card. In this way the user record becomes the primary record for the user and the old smart card becomes redundant. This allows migration between the two systems without requiring new cards to be issued to patrons immediately.

It will be understood to persons skilled in the art of the invention that many modifications may be made without departing from the spirit and scope of the invention, in particular, that features described above can be employed to form other embodiments. For example, analogous transactions could be carried out at a terminal (e.g. a cash out terminal) rather than at a gaming machine and the interface module could be provided within the cash out terminal.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of processing a user data card in a new loyalty system comprising:
    determining that a user data card comprising a smart card has been entered into a card reader of the new loyalty system, the smart card being incompatible with the new loyalty system and compatible with a superseded loyalty system;
    obtaining a user identifier from a magnetic stripe of the user data card; and
    processing the user identifier to obtain data from a corresponding user record to enable further processing of the user data card in the new loyalty system.

2. A method as claimed in claim 1, wherein the further processing includes transferring credit from the corresponding user record to a gaming machine.

3. A method as claimed in claim 2, further comprising transferring credit to the corresponding user record from a gaming machine.

4. A method as claimed in claim 1, comprising issuing an error message if the user data card does not have a magnetic stripe or the magnetic stripe does not have a user identifier.

5. An interface module for a gaming system, the interface module arranged to be placed in data communication with a card reader and a user database storing user records, the interface module arranged to:
    determine that a user data card comprising a smart card has been entered into a card reader of a new loyalty system, the smart card being incompatible with the new loyalty system and compatible with a superseded loyalty system;
    obtain a user identifier from a magnetic stripe of the user data card; and
    process the user identifier to obtain data from a corresponding user record associated with the identifier to enable further processing of the user data card in the new loyalty system.

6. An interface module as claimed in claim 5, arranged to process the user identifier to send a request to a user server storing said user record.

7. An interface module as claimed in claim 5, wherein the further processing includes participating in a transfer of credit from the corresponding user record to a gaming machine.

8. An interface module as claimed in claim 5, wherein the further processing includes participating in a transfer of credit to the corresponding user record from a gaming machine.

9. An interface module as claimed in claim 5, arranged to issue an error message if the user data card does not have a magnetic stripe or the magnetic stripe does not have a user identifier.

10. A gaming system comprising:
    a card reader arranged for use in a new loyalty system;
    a user database storing user records; and
    an interface module arranged to:
        determine that a user data card comprising a smart card has been entered into the card reader, the smart card being incompatible with the new loyalty system and compatible with a superseded loyalty system;
        obtain a user identifier from a magnetic stripe of the user data card; and
        process the user identifier to obtain data from a user record associated with the user identifier to enable further processing of the user data card in the new loyalty system.

11. A gaming system as claimed in claim 10, further comprising a gaming machine, and wherein the further processing comprises transferring credit from the user record to the gaming machine.

12. A gaming system as claimed in claim 11, comprising a player marketing module in data communication with the gaming machine, the card reader and the interface module provided by the player marketing module.

13. A gaming system as claimed in claim 10, further comprising a gaming machine, and wherein the further processing comprises transferring credit to the user record from the gaming machine.

14. A gaming system as claimed in claim 10, comprising a user server hosting said user database.

15. A gaming system as claimed in claim 10, wherein the interface module is arranged to issue an error message if the user data card does not have a magnetic stripe or the magnetic stripe does not have a user identifier.

16. A gaming system comprising:
    a card reader arranged for use in a new loyalty system;
    a user database storing user records; and
    an interface module arranged to:
        conduct transactions for a user in the new loyalty system by retrieving data from a user record using a user identifier obtained from a magnetic stripe of a hybrid data card while the user has a hybrid data card comprising a smart card compatible with a superseded loyalty system; and
        process transactions from a smart card compatible with the new loyalty system to the exclusion of the smart card associated with the superseded loyalty system once it is detected that a user has a user data card comprising a valid smart card associated with the new loyalty system.

17. A gaming system as claimed in claim 16, wherein the interface module is arranged to write data to the valid smart card in response to determining that the user has a new user data card comprising the valid smart card.

18. A gaming system as claimed in claim 16, comprising a gaming machine and a player marketing module in data communication with the gaming machine, the card reader and the interface module provided by the player marketing module.

19. A gaming system as claimed in claim 16, comprising a user server hosting said user database.

* * * * *